Dec. 27, 1960  M. L. ABEL  2,966,459
MATERIAL HAVING OIL RETAINING PROPERTIES
Filed Aug. 5, 1955
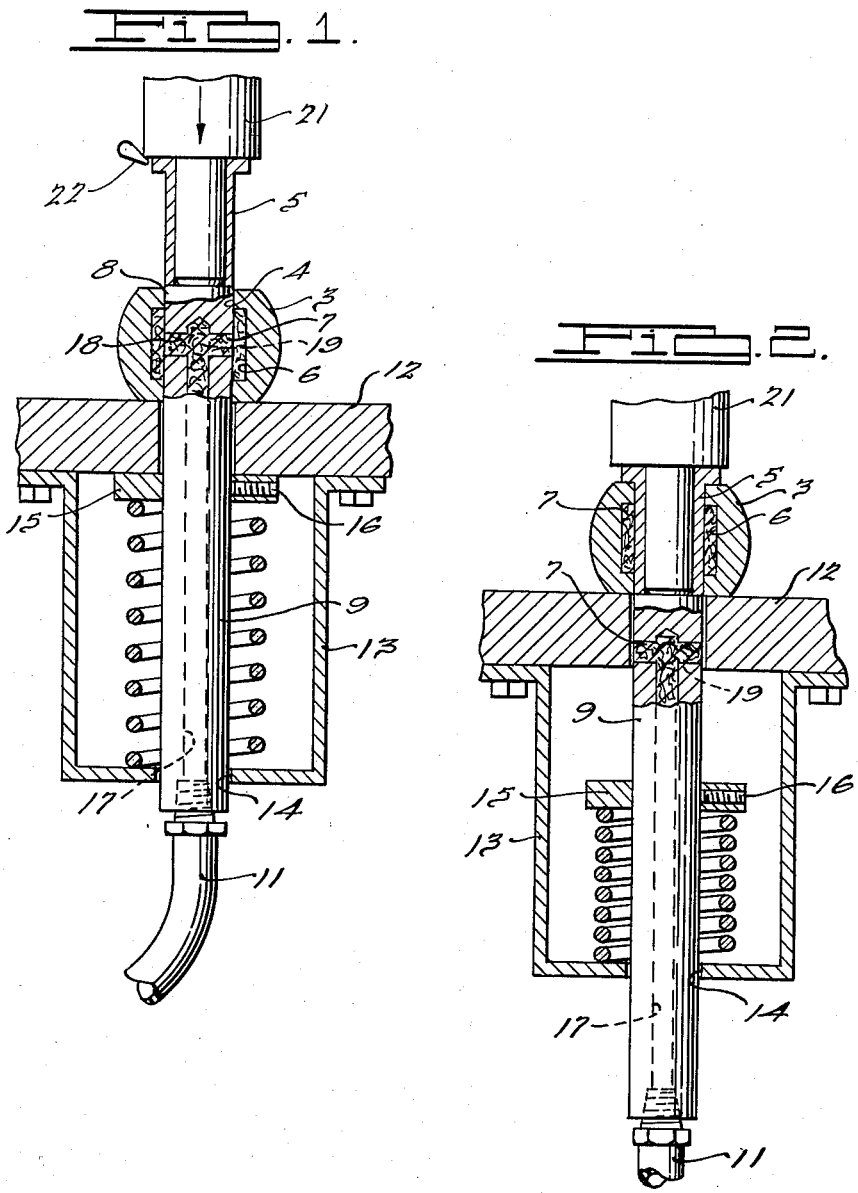
INVENTOR.
Martin L. Abel.
BY
Harness, Dickey & Pierce
ATTORNEYS.

United States Patent Office 2,966,459
Patented Dec. 27, 1960

2,966,459
MATERIAL HAVING OIL RETAINING PROPERTIES

Martin L. Abel, Detroit, Mich., assignor, by mesne assignments, to Fluidwick Company, Inc., a corporation of Michigan Filed Aug. 5, 1955, Ser. No. 526,757

2 Claims. (Cl. 252—14)

This invention relates to wicking material and particularly to a material which retains oil in the presence of pressure.

Various types of wicking material have been employed heretofore in the art for bearing and like applications which retains the oil to a degree sufficient to wet a shaft in contact therewith. A long felt want is satisfied by the wicking material of the present invention which retains oil to such a degree that wicking material may be injected under pressure into a cavity in a bearing. No such materials are known in the art, and the material of the present invention appears to meet this long felt want. The bulk material is made up of organic cellulose fibers of extremely small lengths which has the affinity for a substantial amount of oil which is tenaciously retained against separation therefrom. The wicking material may be placed in a device from which it is injected under pressure into cavities, such as those of bearings, just prior to the insertion of a sleeve therein for enclosing the cavity. No additional time or labor is required for placing the wicking material in the cavity and assurance is had that a supply of oil will be provided for the bearing sleeve throughout the life of the bearing.

Accordingly, the main objects of the invention are: to provide a wicking material having substantial affinity for oil; to provide a wicking material saturated with oil to a degree of approximately 6 parts of oil to 1 part of cellulose material by weight; to provide a material saturated with oil which is tenaciously retained thereby, permitting it to be injected under pressure, and in general to provide a wicking material which retains the oil in the presence of pressure permitting it to be injected or otherwise subjected to pressure.

Other objects and features and novelties of the invention will be either specifically pointed out or will become apparent when referring, for a better understanding of the invention, to the following description taken in conjuction with the accompanying drawing, wherein:

Figure 1 is a sectional view of a bearing and sleeve in position to be assembled in a press with a delivery device for wicking material associated therewith; and Figure 2 is a view of the structure illustrated in Figure 1 after the delivery of the wicking material and the assembly of the sleeve within the bearing body.

In the figures a bearing body 3 has an aperture 4 into which a porous bearing sleeve 5 is to be press-fitted. A recess 6 in the nature of a reservoir is provided on the interior of the body 3 for containing the wicking material 7 of the present invention. The bearing body 3 is placed over the projecting end 8 of a tubular nozzle 9 which is connected by a flexible tube 11 to a pressure injecting mechanism (not illustrated, but which is obtainable in the art). The body 3 rests upon a bed 12 having a stirrup 13 extending downwardly from the under side thereof and having an aperture 14 through which the nozzle 9 is guided. A collar 15 is provided about the nozzle 9 being secured in adjusted position by a set screw 16 which limits the projection of the end 8 above the bed 12. A central aperture 17 is provided through the nozzle 9 communicating with cross passageways 18 and 19 which are disposed opposite to the recess or reservoir 6 when the collar 15 strikes the bottom of the bed 12.

The initial movement of a ram 21 downwardly to press the sleeve 5 into the body 3, operates a lever 22 which actuates a mechanism to discharge a metered amount of the wicking material 7 from the cross passageways 18 and 19 into the reservoir 6. The continued movement of the ram 21 downwardly further advances the sleeve 5 into the body 3 and moves the nozzle 9 downwardly to have the end of the portion 8 disposed in the plane of the bed 12 as illustrated in Figure 2. The sleeve traps the wicking material within the recess or reservoir 6 in position to provide lubrication through the interstices of the bearing sleeve 5 onto a shaft operating therein. When the same is raised the finished bearing will be raised from the bed 12 by the nozzle 9 which will be in position to receive the next body 3 to be placed on the end 8 thereof.

The above described assembly of a sleeve within a bearing having a wicking material therein is made possible by using the particular wicking material of the present invention. The fibers which form the oil-absorbing part of the wicking material are of cellulose, being made from wood fibers and a mixture of paper-containing fibers of wood, cotton and the like. Substantially equal parts of the wood and paper are macerated to produce the fibrous material, the major amount of the material having fiber lengths of from 0.5 to 2.0 millimeters in length. The actual length of the fibers is shown in the following analysis of a sample thereof:

Length of fiber

| Millimeters: | Percentage |
|---|---|
| 0.5 | 18 |
| 1.0 | 39 |
| 1.5 | 18 |
| 2.0 | 11 |
| 2.5 | 6 |
| 3.0 | 4 |
| 3.5 | 4 |

It will be seen that the greater numbers of fibers are substantially one millimeter in length and when mixed with the smaller and larger fibers have a great affinity for oil, not only for holding the oil but for retaining it against flow therefrom. Wicking materials having longer fibers alone or combined with asbestos, talc and the like, lack the oil retaining property when the material is saturated, the oil collecting at the bottom of a mixture from which it will drip. Especially is this true if the material is heated to 180° F. for example. The present material when saturated with oil not only holds the oil but retains the oil against flow to the bottom of a mixture even in the presence of the 180° temperature. This tenacious retaining property of the bulk material is attributed to the surface adhesion of the oil on the minute cellulose particles of the bulk material. The oil is retained by the material to such a degree that it may be injected under pressure into the cavity 6 of the bearing, as described above. The material will readily hold 10 parts by weight of oil to 1 part of the bulk material and when injected into the cavity 6, as above described, a ratio of 6 or 8 to 1 is preferably employed.

The ash content of the bulk material was surprisingly high being about 1%, more than twice as high as that of wood fibers. This can be attributed to the paper and the high mineral content of the paper fibers aided materially in the adhesion of the oil to the fiber surfaces. An example of the ash analysis is as follows:

Content of ash expressed in percentages:

| Cr | Al | Si | Mg | Fe | Cu |
|----|----|----|----|----|----|
| 20 | 20 | 10 | 1.0 | 0.5 | 0.1 |

The oil and bulk material are weighed to a desired proportion up to a 10 to 1 ratio, by weight, and the mixture is then thoroughly stirred to have the entire surface of each fiber thoroughly wetted by the oil. It is this complete wetting of the surface of each individual fiber that provides the resulting mass with the ability to absorb and retain the oil in the presence of heat and pressure. It was found that even if minute fibers are present in the wicking material that the fibers would not hinder the delivery of oil through the minute interstices of the porous bearing sleeve 5 in which they may extend, as the shaft operating within the sleeve was lubricated at all times.

Where heretofore wicks and wicking material were applied to bearings by hand methods, the wicking material of the present invention is applied at the time the sleeve is press-fitted in the bearing body without any additional operations or labor. This reduces the cost of the bearing and provides assurance that a proper amount of wicking material is present to oil the surface of the bearing sleeve throughout the life of the bearing. This was found true from many life tests made on bearings such as that shown in the drawing, as well as those of other types having reservoirs for wicking material, the life being extended substantially beyond that of comparable bearings obtainable in the trade.

What is claimed is:

1. An extrudable wicking material having a body made from wood fibers of variegated lengths substantially all of which are less than about 3.5 millimeters in length, and a fluid lubricating oil for a bearing retained by said material in a ratio greater than one part of fibers to four parts of oil by weight, said wicking material being injectable into a cavity through a small orifice, with the oil retained in the injected material after said injection.

2. An extrudable wicking material including a body of macerated wood fibers of variegated lengths the bulk of which is less than about 3.5 millimeters in length, and a bearing type fluid lubricating oil retained by said body in an amount greater than one part fibers to four parts of oil by weight providing a material which is readily injectable into a cavity through a small orifice, with the oil adapted to be retained in the material after any such injection.

References Cited in the file of this patent

UNITED STATES PATENTS

| | | |
|---|---|---|
| 31,346 | Winans et al. | Feb. 5, 1861 |
| 764,890 | Hendrickson | July 12, 1904 |
| 1,001,371 | Drury | Aug. 22, 1911 |
| 1,362,946 | Lawson | Dec. 23, 1920 |
| 1,581,804 | Kimmel et al. | Apr. 20, 1926 |
| 1,916,744 | Skillman | July 4, 1933 |
| 2,019,241 | Weiss | Oct. 29, 1935 |
| 2,303,068 | Schoenbaum | Nov. 24, 1942 |